United States Patent
Pounds

[19]

[11] Patent Number: 6,116,408
[45] Date of Patent: Sep. 12, 2000

[54] APPARATUS AND SYSTEM FOR CONTROLLING THE OPERATING FREQUENCY OF AN ELECTROMAGNETIC VIBRATORY FEEDER AT A SUBMULTIPLE OF THE POWER LINE FREQUENCY

[75] Inventor: David G. Pounds, Marion Center, Pa.

[73] Assignee: FMC Corporation, Chicago, Ill.

[21] Appl. No.: 09/126,263

[22] Filed: Jul. 30, 1998

[51] Int. Cl.[7] .................................................. B65G 27/24
[52] U.S. Cl. ........................... 198/769; 198/762; 318/114
[58] Field of Search .................................. 198/762, 769, 198/751; 318/114

[56] References Cited

U.S. PATENT DOCUMENTS

| | | | |
|---|---|---|---|
| 4,145,646 | 3/1979 | Werderitch | 318/782 |
| 4,331,263 | 5/1982 | Brown | 198/769 |
| 4,350,243 | 9/1982 | Weyandt | 198/769 |
| 4,354,618 | 10/1982 | Weyandt | 198/769 |
| 4,380,730 | 4/1983 | Morton, Jr. | 323/300 |
| 4,441,060 | 4/1984 | Hamer et al. | 318/114 |
| 4,811,835 | 3/1989 | Bullivant et al. | 198/762 |
| 4,921,090 | 5/1990 | Gregor | 198/769 |
| 5,074,403 | 12/1991 | Myhre | 198/769 |
| 5,080,218 | 1/1992 | Izume et al. | 198/762 |
| 5,158,170 | 10/1992 | Grengg et al. | 198/762 |

*Primary Examiner*—Douglas Hess
*Attorney, Agent, or Firm*—Rockey, Milnamow & Katz, Ltd.

[57] ABSTRACT

An apparatus and system are provided for controlling the operating frequency of an electromagnetic vibratory feeder at a submultiple of the power line frequency. The apparatus is couplable to a terminal of an electromagnetic coil of the electromagnetic vibratory feeder, to control the current through the electromagnetic coil and thereby control power delivered to the electromagnetic vibratory feeder. The apparatus includes a quadrac coupled to the alternating current source; a capacitor coupled to the AC current power source and coupled through a first diode to a gate electrode of the quadrac; and a resistive network coupled through a second diode to the capacitor and to the first diode. The capacitance value of the capacitor and the resistive value of the resistive network form an RC time constant, which is predetermined to provide a selected operating frequency for triggering the quadrac and thereby providing power to the electromagnetic vibratory feeder at a submultiple of the power line frequency.

15 Claims, 2 Drawing Sheets

APPARATUS AND SYSTEM FOR CONTROLLING THE OPERATING FREQUENCY OF AN ELECTROMAGNETIC VIBRATORY FEEDER AT A SUBMULTIPLE OF THE POWER LINE FREQUENCY

FIELD OF THE INVENTION

The present invention relates, in general, to apparatuses and systems for controlling operating frequencies, and more particularly, to an apparatus and system for controlling the operating frequency of an electromagnetic vibratory feeder at a submultiple of the power line frequency.

BACKGROUND OF THE INVENTION

In the prior art, electromagnetic vibratory feeders typically have been operated at frequencies obtained directly from power line frequencies, such as at 60 Hz in the United States and generally in North America, and at 50 Hz in Europe, Asia, and other parts of the world. A particular advantage of operating such electromagnetic vibratory feeders at the applicable power line frequency is that the corresponding frequency controls are comparatively simple and cost advantageous, especially for relatively small feeders where the cost of the control mechanism may be a significant portion of the overall feeder cost.

There are various benefits to operating electromagnetic vibratory feeders, however, at frequencies lower than the power line frequency. Because acceleration is a function of the square of the operating frequency, the feeders operating at power line frequencies are subject to high accelerations, which place large demands on the integrity of mechanical structures, significantly adding to equipment costs and reducing the expected equipment lifetime. The requirements for the springs utilized in such electromagnetic vibratory feeders are also determined, among other things, by the frequency of operation; operation at power line frequencies therefore requires a large number of expensive springs that are subject to high stresses and which are difficult to maintain in a stable fashion. Lastly, feed rate is determined by various combinations of feeder amplitude, frequency and feed angle, such that better or more optimal combinations for performance may be obtained at lower operating frequencies.

Prior art solutions for providing low frequency controls typically involve complicated electronic circuitry, such as in power inverters or other complex means of control. While such complicated controls may be economically feasible for large feeders, such controls are prohibitively expensive for use in smaller feeders. As a consequence, a need remains for an apparatus and system to provide a means to control, at low cost, the operating frequency of an electromagnetic vibratory feeder at a submultiple (or fraction) of the power line frequency, without sacrificing output control.

SUMMARY OF THE INVENTION

An apparatus and system are provided in accordance with the present invention which controls the operating frequency of an electromagnetic vibratory feeder at a submultiple of the power line frequency. For example, when the frequency of the available power line is 60 Hz, the apparatus and system of the present invention may be tuned, through selection of appropriate RC time constants, to provide an operating frequency at, for example, 40 Hz, 30 Hz, 24 Hz, 20 Hz, and so on. The apparatus and system of the present invention may be implemented at low cost, and is especially useful for providing frequency control for smaller vibratory feeders, without sacrificing output control.

The present invention utilizes the triggering of a quadrac, or other switching devices, to supply power to a vibratory feeder at the desired or selected operating frequency. The frequency of the triggering of the quadrac, in turn, is controlled by the tuning of an RC time constant of a capacitor in conjunction with a resistive network. The capacitor is utilized to store charge, such that when the capacitor reaches a trigger or threshold voltage, it will trigger or turn on the quadrac. An RC time constant is selected such that the capacitor reaches such a threshold or trigger voltage at a frequency less than the frequency of the power line. The quadrac is thereby triggered at a frequency which is a submultiple of the power line frequency, and thereby provides power to the vibratory feeder at an operating frequency which is also a submultiple of the power line frequency.

The various embodiments of the present invention may be utilized to control the operating frequency of an electromagnetic vibratory feeder both at even and at odd submultiples of the power line frequency. The various embodiments may also be tuned to have an operating frequency at or near the resonant frequency of the vibratory feeder, thereby resulting in a maximum vibration at a comparatively minimal applied energy.

Numerous other advantages and features of the present invention will become readily apparent from the following detailed description of the invention and the embodiments thereof, from the claims and from the accompanying drawings.

DETAILED DESCRIPTION OF THE INVENTION

Figure 1:
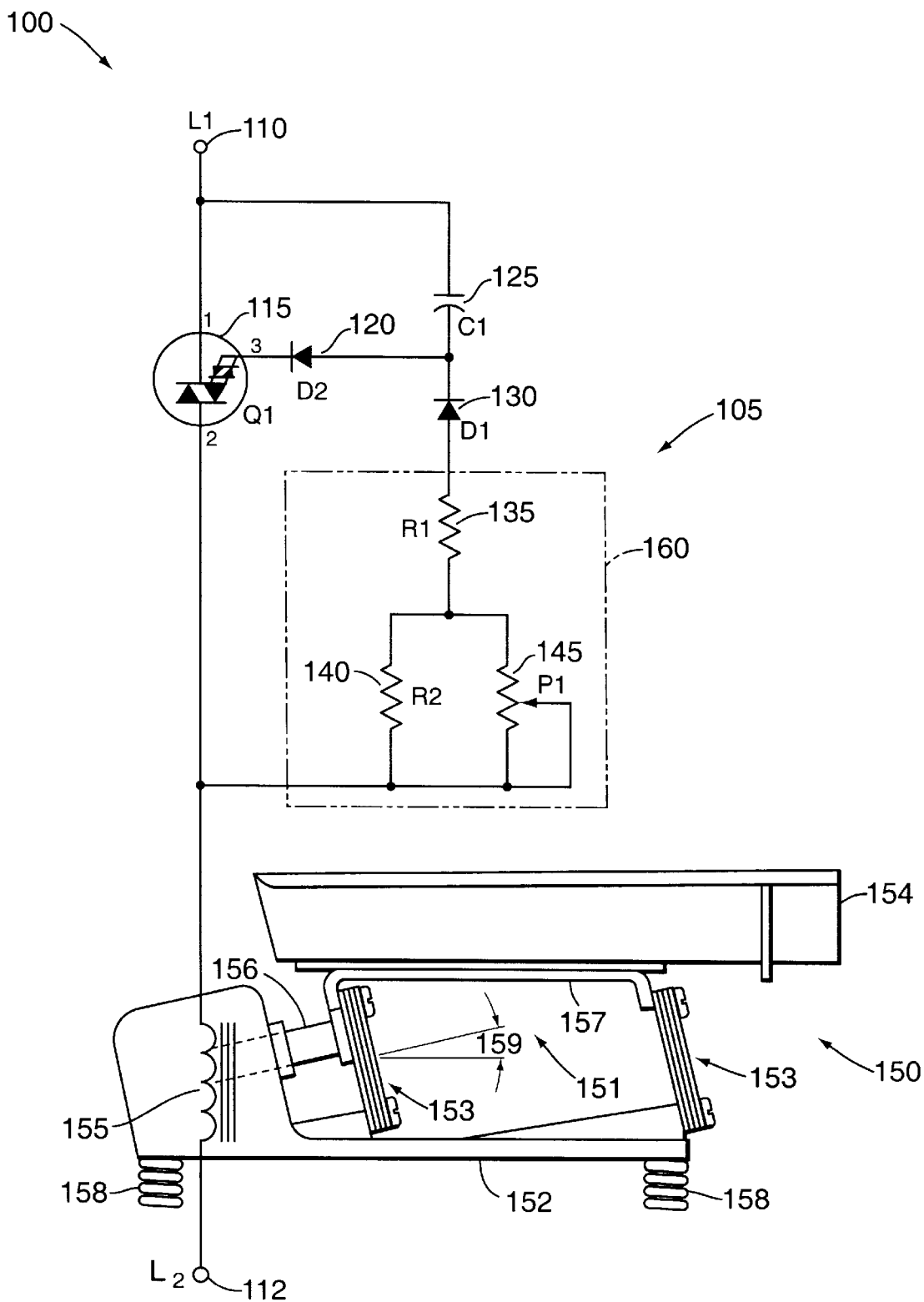
FIG. 1 is a circuit and block diagram of a first preferred apparatus and system embodiment of the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for an apparatus and system, which may be manufactured and implemented at low cost, to provide control over the operating frequency of an electromagnetic vibratory feeder, preferably at a submultiple of the power line frequency. In accordance with the present invention, such an apparatus and system are provided which allows the operation of an electromagnetic vibratory feeder at such a low frequency, without sacrificing output control.

FIG. 1 is a circuit and block diagram illustrating an apparatus 105 and system 100 in accordance with the present invention. As illustrated in FIG. 1, a power line terminal 110 is connected to a lead of a quadrac 115 and to a negative lead of a capacitor 125. A second power line terminal 112 is coupled to one of the terminals of an electromagnetic coil 155, which is part of the electromagnetic vibratory feeder 150. In use, the power line terminals 110 and 112 are connected through suitable switches or contacts of an electromagnetic power relay, with fuses to the available alternating current ("AC") power source, and may take on varied forms in various embodiments of the present invention. In the preferred embodiment, the power source is a standard 120 V, 60 Hz AC power line.

Continuing to refer to FIG. 1, the positive lead of the capacitor 125 is connected to the anode of diode 120 and to the cathode of the diode 130. The cathode of the diode 120 is connected to the gate (or trigger) lead of the quadrac 115. The anode of diode 130 is connected to a resistive circuit 160, consisting of resistor 135 connected in series to the parallel configuration of resistor 140 and potentiometer 145. The apparatus 105 is then coupled to the other terminal of the electromagnetic coil 155.

The electromagnetic feeder 150 is illustrated in FIG. 1 as a two mass system, and consists of trough side mass members 151 connected to a base mass 152 by means of spring banks 153. The trough side mass members 151 consist of a trough 154, an electromagnetic armature 156, and a mounting bracket 157 (which connects one side of the spring banks 153 to the trough 154 and is also attached to the electromagnetic armature 156). The base mass 152 contains the electromagnetic coil (and core) 155 along with attachments for the remaining ends of the spring banks 153, with mounting means for isolation springs 158 (which isolate dynamic vibration forces produced by the feeder from its mounting support). The operation of the apparatus 105 and system 100 of the present invention is explained below.

When the system 100 is connected through power leads 110 and 112 to an AC power source, such as a 60 Hz or 50 Hz AC power source, the capacitor 125 is allowed to charge through the resistive circuit 160 and diode 130. When the charge on the capacitor 125 reaches a trigger or threshold voltage of the gate of the quadrac 115, the capacitor 125 provides energy to turn the quadrac 115 on and discharges through the gate of the quadrac 115. Once powered on, the quadrac 115 allows current to flow through the electromagnetic coil 155 of the electromagnetic feeder 150 for one-half cycle of the AC power wave form. More specifically, as the current through the electromagnetic coil 155 decreases as the applied AC power decreases, the current falls below the holding current of the quadrac 115, and the quadrac 115 self-commutates off. The capacitor 125 is then allowed to charge once again, as previously explained, as the AC cycle is repeated.

When the quadrac 115 is on, the current flow through the electromagnetic coil 155 of the electromagnetic feeder 150 creates a magnetic flux that attracts the armature of the feeder and deflects the springs 153, pulling the trough 154 in a first direction (back and downward) due to the mounting angle 159 of the springs 153. Conversely, when the current flow through the electromagnetic coil 155 of the electromagnetic feeder 150 is diminished, the energy stored in the springs 153 is released, moving the trough 154 in a second, opposite direction (forward and upward). As the cycle is repeated, the angular vibration created will cause material contained in the trough 154, such as small packages, to feed toward a discharge end of the trough 154.

The frequency of the vibration of the electromagnetic feeder 150 will be the frequency of the on time of the quadrac 115, which is controlled by the charge on capacitor 125 reaching the threshold or trigger voltage of the quadrac 115. The natural frequency of the electromagnetic feeder 150 (i.e., the frequency at which the feeder's mass and spring system freely vibrates when a momentary external force is applied), may be adjusted, for example, by changing the number or the thickness of the springs 153. When the natural frequency of the electromagnetic feeder 150 is in the vicinity of or otherwise close to the frequency of the applied power, through adjustment of either the natural frequency or the operating frequency, a condition known as resonance may be created, in which maximum displacement of the trough 154 may be obtained at a comparatively minimal applied energy.

In accordance with the present invention, the frequency (timing or delay) of the triggering of the quadrac 115 is adjusted by correspondingly adjusting a time constant of the RC network consisting of capacitor 125 and the resistive network 160. By varying the time to reach the threshold voltage, the frequency of the quadrac 115 being on and conducting will be varied from the power line frequency, such as the quadrac 115 being on and conducting every other cycle (or greater). Diode 130 is utilized to prevent a discharge path of capacitor 125 when the voltage changes polarity between the terminals 110 and 112, thereby allowing capacitor 125 to retain its charge during whatever number of power line cycles that may occur for the correspondingly selected RC time constant.

For example, for a selected output frequency of 30 Hz, and utilizing a TECCOR Q4010LT (as the quadrac 115) having a threshold voltage of approximately 33 V, the capacitor 125 is charged just below its trigger level during the first positive half cycle of the AC power source (after the quadrac 115 has stopped conducting). The capacitor 125 retains its charge over the following negative half cycle, and then completes its charging to the 33 V level to trigger the quadrac 115 in the next positive half cycle, thus skipping every other cycle to produce the 30 Hz output from a 60 Hz power source. In the preferred embodiment, a satisfactory time constant for the RC delay network has been obtained when the resistors 135 and 140 and the potentiometer 145 were each 1 megaohm, rated at one-half watt, with the capacitor 125 being 0.033 microfarads, rated at 250 V AC. The time constant may also be varied through the potentiometer 145, which may be either in parallel with resistor 140 or may short resistor 140, to create minimum and maximum time constants. Delaying the trigger point between these minimum and maximum levels provides control over the power delivered to the vibratory feeder 150, as the on time of the quadrac 115 may be reduced by triggering later into the positive half wave form. The diode 120 is utilized in the preferred embodiment to ensure that the quadrac 115 will only trigger on positive half cycles, and otherwise may be omitted. The diodes 120 and 130 utilized in the preferred embodiment are both 1N4007, rated at 1000 V and 1 ampere. In addition, as alternatives to the quadrac 115, other switching devices may also be utilized without departing from the spirit and scope of the present invention, such as a TRIAC or an SCR. In accordance with the present invention, the operating frequency of the electromagnetic feeder 150 is controlled and determined by the triggering of the quadrac 115. Triggering the quadrac 115 once every one and one-half cycles of a 60 Hz power source would result in an operating frequency of 40 Hz (2,400 vibrations per minute (VPM)); triggered once every other cycle would result in an operating frequency of 30 Hz (1,800 VPM); triggered once every two and a half cycles would result in an operating frequency of 24 Hz (1,440 VPM), and so forth. In the embodiment illustrated in FIG. 1, because the capacitor 125 does not charge when the quadrac 115 is on, and the diode 130 allows the capacitor 125 to charge only when its anode is positive with respect to its cathode, the operating frequencies obtained from this apparatus 105 are even submultiples of the power line frequency, i.e., 60 Hz, 30 Hz, 20 Hz, etc. To obtain frequencies of odd submultiples, such as 40 Hz, 24 Hz, etc., both positive and negative half waves of the power source are utilized, as illustrated in FIG. 2.

Figure 2:
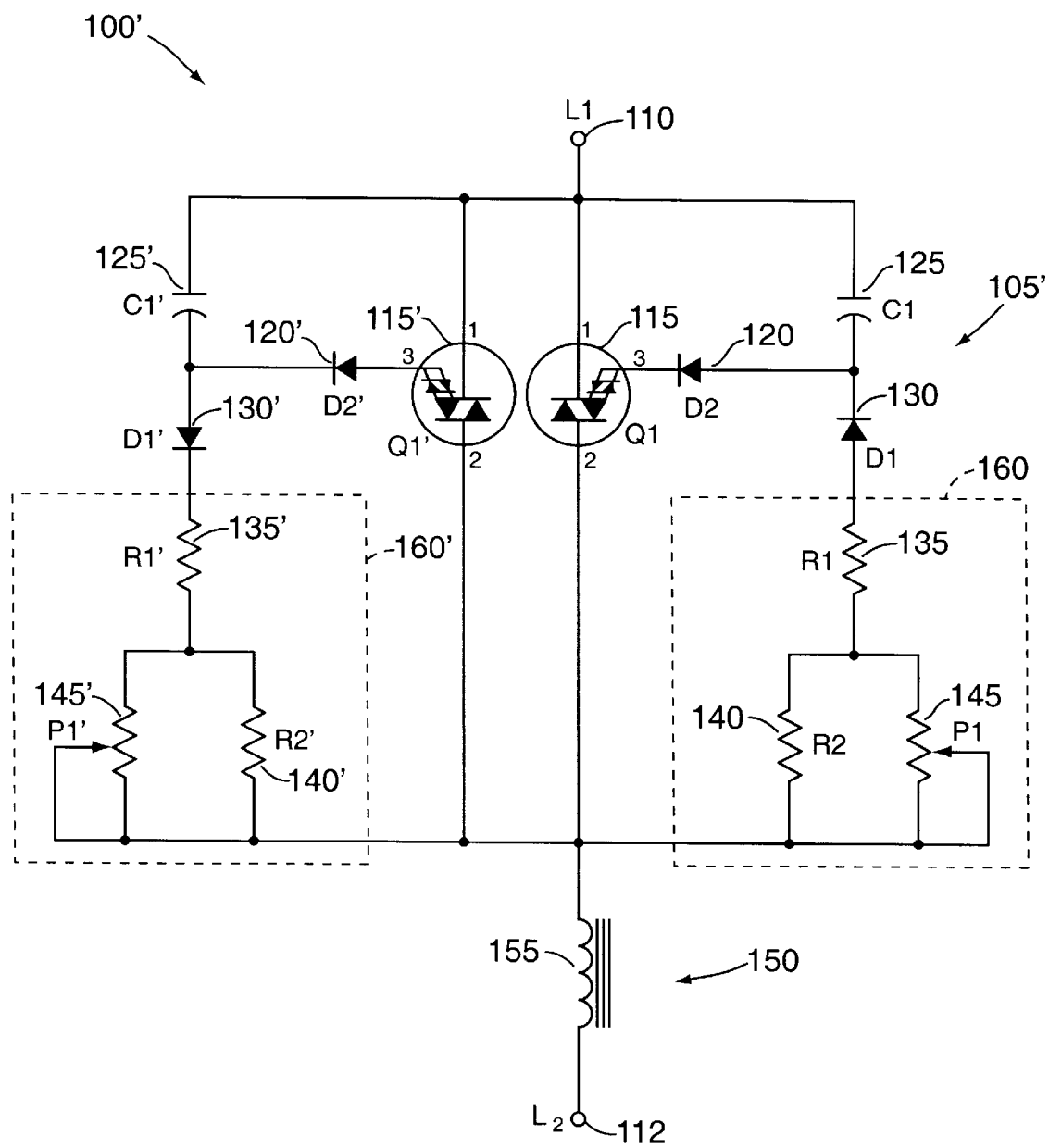
FIG. 2 is a circuit and block diagram of a second preferred apparatus and system embodiment of the present invention.

FIG. 2 is a circuit diagram illustrating a second apparatus 105' and system 100' utilized to provide control of the operating frequency of the electromagnetic feeder 150 during both positive and negative half cycles of the power source. The quadrac 115 is implemented in a first configuration to control the application of power during positive going half cycles, and the quadrac 115' is implemented in a second configuration to control the application of power during negative going half cycles. As previously described, the diode 130 allows the capacitor 125 to charge on positive going half cycles for the required time period without discharging prior to reaching the trigger voltage of quadrac 115. Similarly, the diode 120' allows the capacitor 125' to charge on negative going half cycles for the required time period without discharging prior to reaching the trigger voltage of quadrac 115'. The diode 120 is utilized to insure that the quadrac 115 will only trigger on positive half cycles, and the diode 120' is used to insure that the quadrac 115' will only trigger on negative half cycles. In operation, the apparatus 105' of FIG. 2 may operate at a self-generating frequency of 40 Hz, for example, in which the capacitor 125 is charged over a time period comprising two positive half cycles for charging, interspersed with three negative half cycles in which no charging occurs, followed by the trigger of quadrac 115 at the start of the next positive going half cycle. Similarly, the capacitor 125' would charge up over a period comprising two negative half cycles for charging, interspersed with three positive half cycles in which no charging occurs, followed by the trigger of quadrac 115 at the start of the next negative going half cycle. The operating frequency of the vibratory feeder 150 is then the sum of the on (trigger) frequencies of each of the quadracs 115 and 115'. In this example, the total time between trigger points for either quadrac 115 or 115' would be 50 milliseconds, resulting in a 40 Hz operating frequency.

The apparatus 105' of FIG. 2 may also be utilized to control the applied power at even submultiples of the power line frequency, typically by disabling one-half of the circuit. In addition, such control for even submultiples may be implemented by adjusting the time constants of the trigger circuits such that quadracs 115 and 115' trigger approximately immediately after one another, resulting in a larger duration of applied power, but at an effective frequency equal to the individual (not summed) trigger frequency of the quadracs 115 and 115'.

As may be apparent from the discussion above, there are numerous advantages of the present invention. First, the apparatus and system of the present invention provide control over the operating frequency of an electromagnetic vibratory feeder, preferably at a submultiple of the power line frequency. Also in accordance with the present invention, such an apparatus and system are provided which allows the operation of an electromagnetic vibratory feeder at such a low frequency, without sacrificing output control, which may be manufactured and implemented at low cost.

From the foregoing, it will be observed that numerous variations and modifications may be effected without departing from the spirit and scope of the novel concept of the invention, It is to be understood that no limitation with respect to the specific methods and apparatus illustrated herein is intended or should be inferred. It is, of course, intended to cover by the appended claims all such modifications as fall within the scope of the claims.

It is claimed:

1. An apparatus for controlling an operating frequency of an electromagnetic vibratory feeder at a submultiple of a power line frequency, the apparatus couplable to a first terminal of an electromagnetic coil of the electromagnetic vibratory feeder, a second terminal of the electromagnetic coil couplable to an alternating current power source having the power line frequency, the apparatus comprising:

a quadrac couplable to the alternating current power source;

a capacitor couplable to the alternating current power source, the capacitor further coupled through a first diode to a gate electrode of the quadrac, the capacitor having a capacitance value;

a resistive network coupled through a second diode to the capacitor and to the first diode, the resistive network having a resistive value, the resistive value in conjunction with the capacitance value forming an RC time constant, wherein the capacitance value, the resistive value and the RC time constant are predetermined to provide a selected operating frequency for triggering the quadrac and thereby providing current through the electromagnetic coil and power to the electromagnetic vibratory feeder at a submultiple of the power line frequency.

2. The apparatus of claim 1 wherein the RC time constant is predetermined such that a voltage reached during charging of the capacitor during a one-half cycle of the alternating current power source, following a first triggering of the quadrac, is less than a threshold voltage for a second triggering of the quadrac.

3. The apparatus of claim 1 wherein the RC time constant is predetermined for the quadrac to be triggered at a submultiple of the power line frequency in the vicinity of a resonant frequency of the electromagnetic vibratory feeder.

4. The apparatus of claim 1 wherein the resistive network further comprises:

a first resistor;

a second resistor connected in series with the first resistor; and a potentiometer coupled in parallel to the second resistor.

5. The apparatus of claim 1 wherein the capacitor is chargeable during a first positive half cycle of the power line frequency, wherein the second diode prevents a discharge of the capacitor during a first negative half cycle of the power line frequency, and wherein the capacitor is chargeable to a quadrac threshold voltage during a second positive half cycle of the power line frequency, thereby triggering the quadrac at a submultiple of the power line frequency.

6. An apparatus for controlling an operating frequency of an electromagnetic vibratory feeder at a submultiple of a power line frequency, the apparatus couplable to a first terminal of an electromagnetic coil of the electromagnetic vibratory feeder, a second terminal of the electromagnetic coil couplable to an alternating current power source having the power line frequency, the apparatus comprising:

a first quadrac couplable to the alternating current power source in a first configuration;

a first capacitor couplable to the alternating current power source, the capacitor further coupled through a first diode to a gate electrode of the first quadrac, the first capacitor having a first capacitance value;

a first resistive network coupled through a second diode to the first capacitor and to the first diode, the first resistive network having a first resistive value, the first resistive value in conjunction with the first capacitance value forming a first RC time constant;

a second quadrac couplable to the alternating current power source in a second configuration;

a second capacitor couplable to the alternating current power source, the second capacitor further coupled through a third diode to a gate electrode of the second quadrac, the second capacitor having a second capacitance value;

a second resistive network coupled through a fourth diode to the second capacitor and to the third diode, the second resistive network having a second resistive value, the second resistive value in conjunction with the second capacitance value forming a second RC time constant;

wherein the first capacitance value, the first resistive value and the first RC time constant are predetermined to provide a first selected frequency for triggering the first quadrac during a positive half cycle of the power line frequency, wherein the second capacitance value, the second resistive value and the second RC time constant are predetermined to provide a second selected frequency for triggering the second quadrac during a negative half cycle of the power line frequency, and thereby providing current through the electromagnetic coil and power to the electromagnetic vibratory feeder at frequency which is a submultiple of the power line frequency.

7. The apparatus of claim 6 wherein the submultiple frequency is the arithmetic sum of the first selected frequency and the second selected frequency.

8. The apparatus of claim 6 wherein the first selected frequency is equal to the second selected frequency and further equal to the submultiple frequency.

9. The apparatus of claim 6 wherein the first RC time constant is predetermined such that a voltage reached during charging of the first capacitor during a one-half cycle of the alternating current power source, following a first triggering of the first quadrac, is less than a threshold voltage for a second triggering of the first quadrac.

10. The apparatus of claim 6 wherein the first RC time constant and the second RC time constant are predetermined for the respective first quadrac and second quadrac to be triggered at a combined frequency in the vicinity of a resonant frequency of the electromagnetic vibratory feeder.

11. A system for controlling an operating frequency of an electromagnetic vibratory feeder at a submultiple of a power line frequency, the system couplable to an alternating current power source having the power line frequency, the system comprising:

an electromagnetic vibratory feeder, the electromagnetic vibratory feeder having an electromagnetic coil couplable to the alternating current power source;

a quadrac couplable to the alternating current power source;

a capacitor couplable to the alternating current power source, the capacitor further coupled through a first diode to a gate electrode of the quadrac, the capacitor having a capacitance value;

a resistive network coupled through a second diode to the capacitor and to the first diode, the resistive network having a resistive value, the resistive value in conjunction with the capacitance value forming an RC time constant, wherein the capacitance value, the resistive value and the RC time constant are predetermined to provide a selected operating frequency for triggering the quadrac and thereby providing current through the electromagnetic coil and power to the electromagnetic vibratory feeder at a submultiple of the power line frequency.

12. The system of claim 11 wherein the RC time constant is predetermined such that a voltage reached during charging of the capacitor during a one-half cycle of the alternating current power source, following a first triggering of the quadrac, is less than a threshold voltage for a second triggering of the quadrac.

13. The system of claim 11 wherein the RC time constant is predetermined for the quadrac to be triggered at a submultiple of the power line frequency in the vicinity of a resonant frequency of the electromagnetic vibratory feeder.

14. The system of claim 11 wherein the resistive network further comprises:

a first resistor;

a second resistor connected in series with the first resistor; and a potentiometer coupled in parallel to the second resistor.

15. The system of claim 11 wherein the capacitor is chargeable during a first positive half cycle of the power line frequency, wherein the second diode prevents a discharge of the capacitor during a first negative half cycle of the power line frequency, and wherein the capacitor is chargeable to a quadrac threshold voltage during a second positive half cycle of the power line frequency, thereby triggering the quadrac at a submultiple of the power line frequency.

* * * * *